(12) United States Patent
Borri et al.

(10) Patent No.: US 9,613,535 B2
(45) Date of Patent: Apr. 4, 2017

(54) METHOD FOR ALLOWING MISSIONS OF UNMANNED AERIAL VEHICLES, IN PARTICULAR IN NON-SEGREGATED AIR SPACES

(75) Inventors: Roberto Borri, Nole (IT); Ferdinando Ricchiuti, Torino (IT); Simone Scarafia, Vigone (IT); Livio Torrero, Saluzzo (IT)

(73) Assignees: CSP-INNOVAZTIONE NELLE ICT SCARL, Torino (IT); SISVEL TECHNOLOGY S.R.L., None (TO) (IT)

( * ) Notice: Subject to any disclaimer, the term of this patent is extended or adjusted under 35 U.S.C. 154(b) by 0 days.

(21) Appl. No.: 14/232,961

(22) PCT Filed: Jul. 27, 2012

(86) PCT No.: PCT/IB2012/053844
§ 371 (c)(1),
(2), (4) Date: Jan. 15, 2014

(87) PCT Pub. No.: WO2013/014646
PCT Pub. Date: Jan. 31, 2013

(65) Prior Publication Data
US 2014/0163852 A1 Jun. 12, 2014

(30) Foreign Application Priority Data
Jul. 27, 2011 (IT) .............................. TO2011A0681

(51) Int. Cl.
*G06F 19/00* (2011.01)
*G08G 5/00* (2006.01)
(Continued)

(52) U.S. Cl.
CPC .......... *G08G 5/003* (2013.01); *G05D 1/0022* (2013.01); *G08G 5/0013* (2013.01);
(Continued)

(58) Field of Classification Search
CPC .......... F01M 11/12; F01M 2011/1453; F01M 2250/60; G06F 11/1641; G06F 21/57;
(Continued)

(56) References Cited

U.S. PATENT DOCUMENTS

| 4,642,775 A | 2/1987 | Cline et al. | |
|---|---|---|---|
| 2003/0200448 A1* | 10/2003 | Foster | G06F 21/85 713/189 |

(Continued)

FOREIGN PATENT DOCUMENTS

| JP | 2008-105591 A | 5/2008 |
|---|---|---|
| WO | 2010/039306 A2 | 4/2010 |

OTHER PUBLICATIONS

Common Operating Picture—*UAV Security Study*, US National Aeronautics and Space Administration, Technical Reports, Heights, Washington, No. ID 20080017116, Oct. 29, 2004, pp. 1-40.
(Continued)

*Primary Examiner* — Muhammad Shafi
(74) *Attorney, Agent, or Firm* — Workman Nydegger

(57) ABSTRACT

A method for allowing missions of unmanned aerial vehicles (UAV), in particular in non-segregated air space, includes the steps of: prearranging a flight plan by an operator of an unmanned aerial vehicle; verifying, by a management and control body, that the flight plan is compatible with other flight plans of other aerial vehicles, and, if necessary, modifying the flight plan so as to prevent any collisions with the other aerial vehicles, wherein the following steps are carried out: encrypting the flight plan, by the management and control body, with a private key of the management and control body, so as to obtain an encrypted flight plan; encoding the encrypted flight plan with a public key of the
(Continued)

unmanned aerial vehicle for which the flight plan is intended, so as to obtain an encrypted and encoded flight plan.

16 Claims, 2 Drawing Sheets

(51) Int. Cl.
 *G05D 1/00* (2006.01)
 *H04L 9/30* (2006.01)
(52) U.S. Cl.
 CPC .......... *G08G 5/0026* (2013.01); *G08G 5/0034* (2013.01); *G08G 5/0039* (2013.01); *G08G 5/0069* (2013.01); *H04L 9/30* (2013.01)
(58) Field of Classification Search
 CPC .......... G06F 21/64; G06F 11/08; G06F 21/53; G06F 21/62; G06F 21/6218; G06F 21/74; G06F 8/65; G06F 9/5061; G10L 15/063; G05D 1/0607; G05D 1/0653; G05D 1/0297; G05D 1/0246; G05D 1/0257; G05D 1/0011; G05D 1/0033; G05D 1/0038; G05D 1/0061; G05D 1/0083; G05D 1/0094; G05D 1/096708; G08G 1/096708; G08G 1/096725; G08G 1/096775
 USPC ........................................................ 701/120
 See application file for complete search history.

(56) References Cited

U.S. PATENT DOCUMENTS

| | | |
|---|---|---|
| 2007/0221782 A1 | 9/2007 | Cerchie et al. |
| 2008/0154486 A1* | 6/2008 | Coulmeau ............ G08G 5/0013 701/120 |
| 2010/0046743 A1* | 2/2010 | Muratani ............... H04L 9/3013 380/28 |
| 2010/0084513 A1 | 4/2010 | Gariepy et al. |
| 2010/0087980 A1 | 4/2010 | Spura |
| 2011/0035149 A1 | 2/2011 | McAndrew et al. |
| 2011/0178658 A1* | 7/2011 | Kotaba ................. G01C 21/005 701/3 |
| 2011/0204188 A1* | 8/2011 | Marcus ............... B64C 29/0058 244/23 B |
| 2012/0084286 A1* | 4/2012 | Hubner .............. G06Q 10/1093 707/737 |

OTHER PUBLICATIONS

John R. Coward, *Information Security for Unmanned Systems*, Management Brief RD-SE-91-1, Jan. 1, 1994, pp. 1-15.
International Search Report dated Dec. 17, 2012, issued in PCT Application No. PCT/IB2012/053844, filed Jul. 27, 2012.
International Preliminary Report on Patentability dated Jan. 28, 2014, issued in PCT Application No. PCT/IB2012/053844, filed Jul. 27, 2012.

* cited by examiner

METHOD FOR ALLOWING MISSIONS OF UNMANNED AERIAL VEHICLES, IN PARTICULAR IN NON-SEGREGATED AIR SPACES

BACKGROUND OF THE INVENTION

1. Field of the Invention

The present invention relates to the technical field of unmanned aerial vehicles, also referred to by means of the acronym UAV.

More in particular, the present invention relates to a method for allowing missions of unmanned aerial vehicles in non-segregated air space.

2. Present State of the Art

It is known that unmanned aerial vehicles can be completely automated, by forcing them to follow a pre-programmed flight profile, or can be remotely controlled by an operator from a fixed or mobile station.

The first designs of unmanned aerial vehicles date back to the 20's, but only since the 90's, with the development of microtechnologies and nanotechnologies, it has been possible to test these vehicles for use in military missions, in order to avoid any risk for humans.

On the other hand, the use of unmanned aerial vehicles for civil applications has recently found much interest due to the increased reliability and lower costs of such vehicles.

By exploiting the possibility of installing various type of on-board sensors, applications have been developed which range from environmental monitoring through video cameras, e.g. for monitoring territories after natural disasters or for monitoring critical infrastructures, to data collection from sensors distributed over the territory.

According to one of the main automatic operation paradigms of these vehicles, which is called "waypoint navigation", there is the possibility of sending to the vehicle's control logic a sequence of GPS coordinates and times representative of a mission to be carried out. For example, the vehicle is sent geographic coordinates and times of permanence over a network of sensors to be interrogated, geographic coordinates of a series of points to be photographed, and so on. It is therefore a task of the vehicle's control logic to automatically pilot the vehicle itself in such a way that it will reach all the desired points ("waypoints") and carry out the required functions.

The scope of use of unmanned aerial vehicles is still limited to segregated air spaces delimited by the operator's line of sight, so that the operator can intervene in real time should dangerous situations arise, e.g. potential collisions with other vehicles within the same air space.

This limitation of use is due to the lack of laws regulating the management of unmanned aerial vehicles for civil applications, in order to allow the latter to fly in non-segregated spaces and to be integrated into an existing air traffic management system.

As a matter of fact, the obligation to use an unmanned aerial vehicle in spaces comprised within the operator's line of sight causes the automatic functions of such vehicles, such as waypoint navigation, to become not very useful or completely useless, and compels the operator to control the vehicle manually.

Aiming at solving the problems that prevent using unmanned aerial vehicles in non-segregated air space, a number of techniques have been developed which utilize automatic "collision sense and avoidance" mechanisms, i.e. mechanisms designed for collision prevention, so as to enlarge the flight space for unmanned aerial vehicles and the number thereof within a given area.

All of the techniques introduced in the literature are subject to the strong limitation of being scarcely scalable in very high traffic areas because, as the number of vehicles within a given area increases, it will however be difficult for the vehicles themselves to make a decision that can avoid any possible collision.

"Collision prevention" methods have been developed which utilize a flight plan calculation service managed by an air space management and control body, with the objective of allowing more aerial vehicles to fly over the same areas without space or time overlapping, de facto reducing the intervention of the operator or of the "collision sense and avoidance" mechanisms to cases of vehicle malfunctions.

A few published patent documents are based on this consideration, such as, for example, Japanese patent application no. JP 2008-105591 and international patent application no. WO 2010/039306, according to which flight plans are managed by an air space management and control body, which decides the routes that each vehicle must follow in a given area and in a given time period, taking care of avoiding any collisions.

In particular, the system described in said Japanese patent application requires the existence of a body entrusted with the management and control of air spaces intended for UAV missions, which body, after receiving from a UAV operator the geographic and time data of the mission, will calculate the flight plan (e.g. waypoints and access times thereof) through an authentication server, also taking into account the UAV profile and the presence of any other UAVs already enabled to carry out missions within the same area. Once the flight plan has been calculated, it can be authenticated and sent to the UAV operator, who will be obliged to use it as a mission path.

However, the above-mentioned Japanese patent application does not employ a mechanism for authenticating the flight plan calculated by the management and control body and sent to the UAV operator, for the purpose of preventing said flight plan from being manipulated or corrupted, e.g. by third parties or by the operator himself.

In said Japanese patent application, reference is also made to the possibility of storing, in an apparatus installed on board the UAV, the data of the flight carried out, which data can then be sent to the authentication server after the flight.

However, in this case as well no mechanism is employed for protecting these data from possible manipulations by, for example, the operator himself.

De facto, this prevents verifying, in a reliable manner, that the operator has strictly followed the route calculated by and received from the entrusted management and control body. This could be useful, for example, to establish the responsibilities of a collision.

SUMMARY OF THE INVENTION

It is therefore one object of the present invention to provide a method for allowing missions of unmanned aerial vehicles, in particular in non-segregated air space, which allows the vehicle itself to operate in a safe manner in areas beyond the line of sight of the vehicle operator.

It is another object of the present invention to provide a method for allowing missions of unmanned aerial vehicles, in particular in non-segregated air space, which allows the vehicle itself to operate in a safe manner in areas where other aerial vehicles are also operating.

It is a further object of the present invention to provide a method for allowing missions of unmanned aerial vehicles, in particular in non-segregated air space, which allows the operator of an aerial vehicle to authenticate the flight plan authorized by the air traffic management and control body.

It is a further object of the present invention to provide a method for allowing missions of unmanned aerial vehicles, in particular in non-segregated air space, which allows an air traffic management and control body to verify that the flight plan authorized by it has been observed.

It is yet another object of the present invention to provide a method for allowing missions of unmanned aerial vehicles, in particular in non-segregated air space, which allows exhibiting a computer proof having evidential efficacy for ascertaining any responsibilities in the event of an accident.

These and other objects of the invention are achieved through a method for allowing missions of unmanned aerial vehicles, in particular in non-segregated air space, as claimed in the appended claims, which are intended to be an integral part of the present description.

The present invention also relates to a device adapted to be installed in an unmanned aerial vehicle, which implements at least a part of the method of the present invention.

In short, the present invention describes a hierarchical service wherein operators of unmanned aerial vehicles who want to carry out missions in an area managed by the management and control body are obliged to refer to the latter.

The operator of an unmanned aerial vehicle sends a flight plan to the management and control body. The management and control body verifies if the flight plan is compatible with other missions that must be carried out in the air space controlled by said body, and possibly corrects it in order to avoid any collision within said air space.

Once defined, the flight plan is signed with the body's private key and is encoded with the public key of the UAV vehicle for which the flight plan is intended.

When the vehicle receives the flight plan, a device authenticates the flight plan by first decoding it with its own private key and then applying the public key of the management and control body.

The device records the flight mission into a memory. The flight data are only accessible to the management and control body, which can use such data to establish any responsibilities in the event of an accident or a collision.

Further features of the invention are set out in the appended claims, which are intended to be an integral part of the present description.

BRIEF DESCRIPTION OF THE DRAWINGS

The above objects will become more apparent from the following detailed description of a method for allowing missions of unmanned aerial vehicles, in particular in non-segregated air space, with particular reference to the annexed drawings, wherein.

DETAILED DESCRIPTION OF THE PREFERRED EMBODIMENTS

Figure 1:
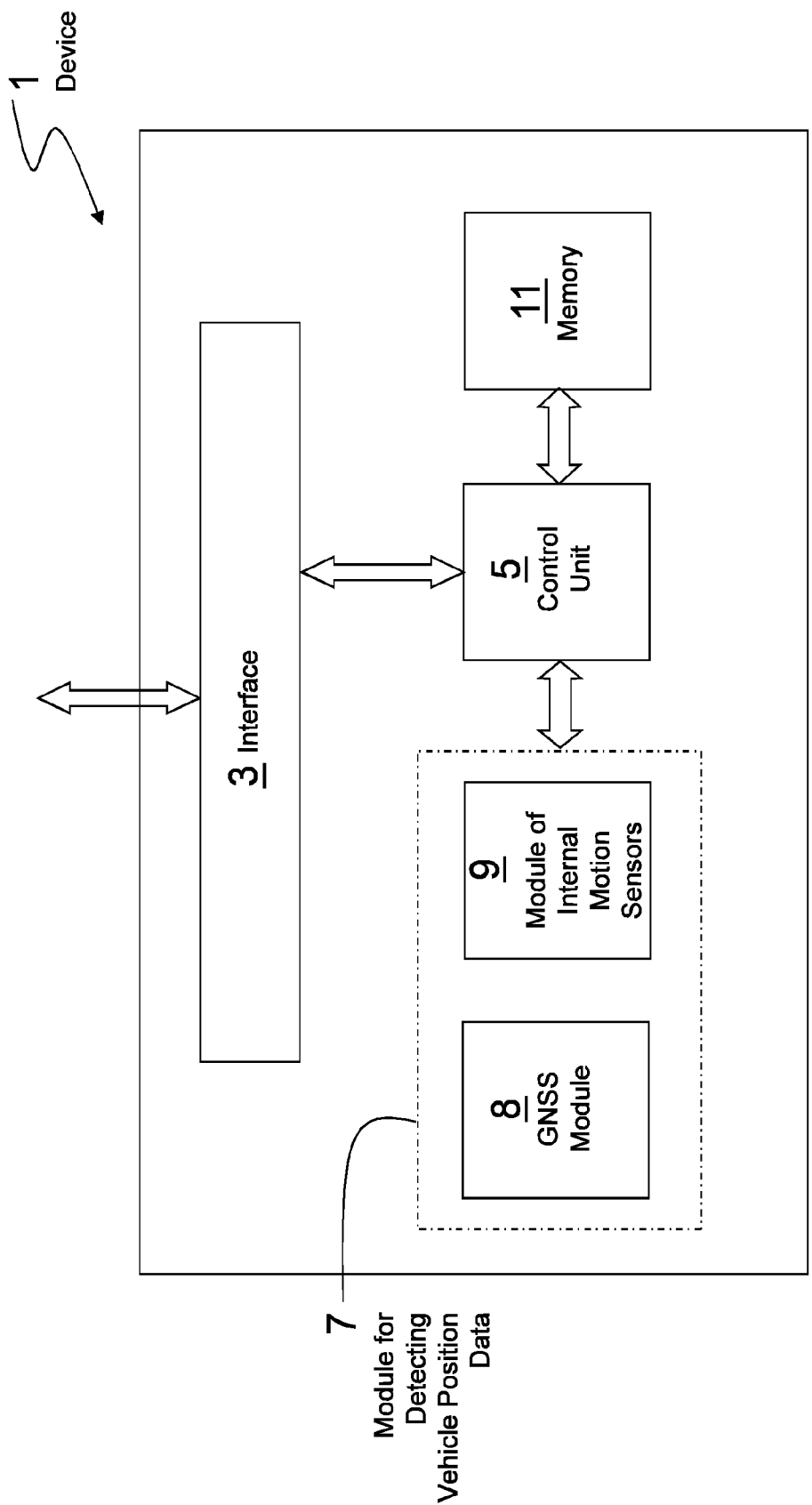
FIG. 1 shows a device adapted to be installed in an unmanned aerial vehicle and to implement at least a part of the method according to the invention.

Referring now to FIG. 1, there is shown a device 1 which is adapted to be installed in an unmanned aerial vehicle (UAV) and which is capable of implementing a method for verifying, authenticating and decrypting a flight plan.

The device 1 comprises:
an interface 3 for receiving a document containing the data of an encrypted and encoded flight plan relating to a mission of the unmanned aerial vehicle;
a control unit 5, in particular a microprocessor, comprising firmware capable of implementing an algorithm for verifying, authenticating and decrypting the document, in particular a file, containing the flight plan data: the microprocessor 5 must only be accessible to a management and control body that provided the flight plan;
a module 7 for detecting vehicle position data, comprising at least one GNSS ("Global Navigation Satellite System") module 8 in order to obtain, through satellite signals, the position data relating to a mission carried out by the vehicle, and possibly also a module 9 of inertial motion sensors, such as, for example, accelerometers and gyroscopes, which, by co-operating with the GNSS module 8, allows locating with more accuracy the path followed by the vehicle during the mission;
a non-volatile memory 11, e.g. a ROM or Flash memory, where the control unit 5 can read and write through a set of functions wired in a pre-programmed logic circuit, which can store the recorded data of the mission carried out for a time period defined by the route management body in view of possible future verifications.

The control unit 5 comprises a protection mechanism that protects the stored data, e.g. based on a set of access permissions, so as to allow exclusive access to the data to the management and control body.

The module 7 for detecting vehicle position data allows recording the data of the mission carried out by the UAV, such as, for example, position, height, direction, speed, acceleration and other parameters, each associated with a time instant; the goal is to preserve such data in the event of an accident, in order to be able to verify afterwards if the causes thereof are fortuitous or due to inobservance of the flight plan.

Since the device 1 must be arranged on board an unmanned aerial vehicle, the weight and size thereof must be such as to not excessively influence the load of the UAV, and it must be placed into a casing suited to withstand high pressures and temperatures which might develop in the event of an accident or a tamper attempt, so as to preserve all the information contained in the memory 11.

Figure 2:
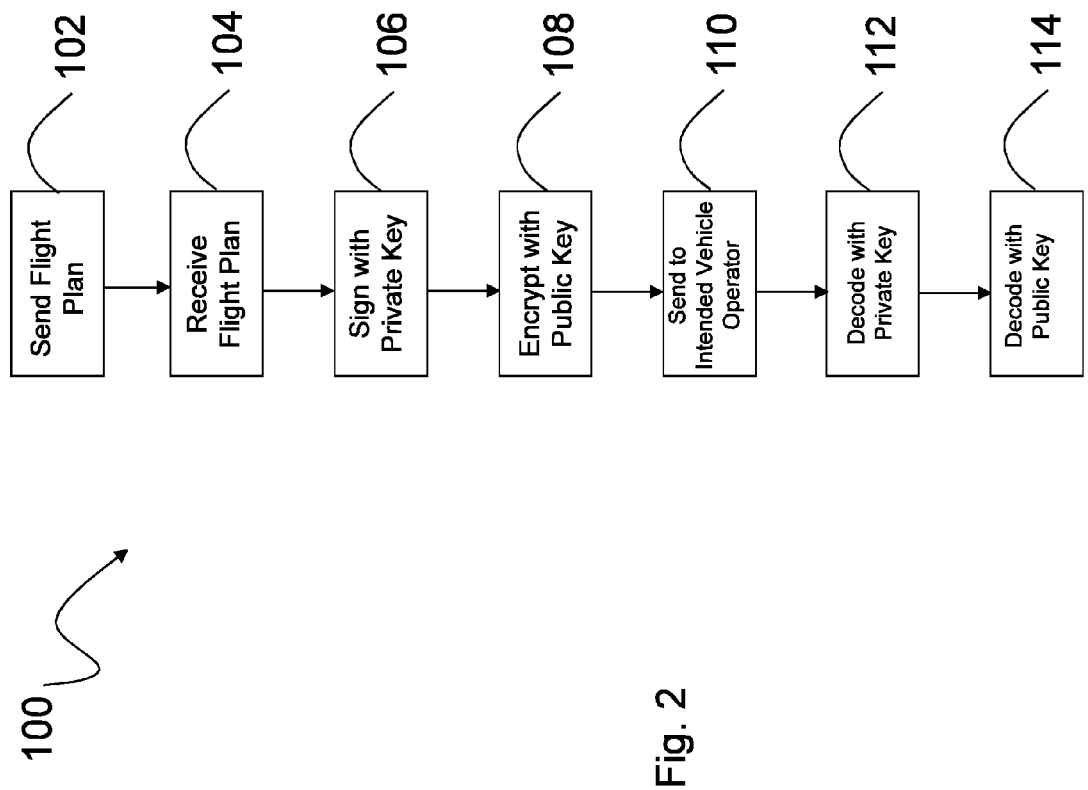
FIG. 2 shows a flow chart of a method according to the invention.

Referring now to FIG. 2, there is shown a flow chart 100 of a method for verifying, authenticating and decrypting a flight plan.

At step 102, the operator of an unmanned aerial vehicle sends to a management and control body a flight plan which comprises at least the following:
the geographic coordinates, e.g. the GPS coordinates, of the points over which the vehicle will fly during the mission;
the times of the mission, e.g. the times of stopping over a point in order to take a photograph or to collect data from a sensor;
the vehicle profile, in particular data relating to type, dimensions, weight, cruise speed, maximum turning angle, and the like.

The flight plan can be sent to the management and control body by means of a data transmission via a telecommunication network, or it can be stored into a magnetic and/or optic medium and then delivered to said body.

At step 104, the management and control body receives the flight plan as prepared by the UAV operator at step 102, and establishes the route that the UAV will have to follow, i.e. the sequence of waypoints and the access times thereof, taking into account the UAV profile and the possible simultaneous presence of other UAVs in the mission area, so as to avoid any collisions.

At step 106, the management and control body signs with its own private key a document, or file, containing the authorized flight plan. The management and control body thus represents a certification authority.

At step 108, the management and control body encrypts the same document with the public key associated with the UAV for which the authorized flight plan is intended. In this manner, only that UAV for which the authorized flight plan has been defined will be able to decode it.

At step 110, the authorized, signed and encrypted flight plan is sent to the intended vehicle operator through the interface 3 of the device 1 of FIG. 1.

At step 112, the authorized, signed and encrypted flight plan is decoded by the microprocessor 5 of the device 1 by using its own private key: thanks to the encryption mechanism applied by the management and control body, this operation can only be carried out by the intended UAV. If the decoding operation is unsuccessful, the UAV operator will receive an error message, and the flight plan cannot be used by the UAV. Therefore, it will be impossible to use a flight plan modified or corrupted by third parties or by the operator himself.

At step 114, if the decoding operation was carried out successfully at step 112, the microprocessor 5 of the device 1 uses the public key of the management and control body to decode the document containing the flight plan authorized by the management and control body.

Said flight plan will then be used by the UAV for its own mission.

According to a preferred embodiment of the invention, the authentication mechanism complies with the FIPS-140 security standards or equivalent, based on a public key infrastructure (PKI). This is a document authentication system on which smartcards are based. In Italy, when applied to digital documents it has the same legal value as an autograph signature on traditional documents.

In substance, the method according to the invention provides a four-fold warranty function:
- it ensures authenticity of the route data by allowing the UAV operator to verify the identity of the management and control body;
- it ensures non-repudiation, in that the management and control body cannot repudiate the signed route document;
- it ensures integrity, by preventing the operator from creating or modifying the route data document, which has been signed by the management and control body;
- it ensures that the route can only be followed by that specific UAV for which it was generated.

The features of the present invention, as well as the advantages thereof, are apparent from the above description.

A first advantage of the method and the device according to the present invention is that they allow implementing those functionalities that allow to provide, in a safe and secure manner, a hierarchical service of UAV traffic management. Implementing such a service is a solution that allows to overcome the limitation that compels such objects to fly in segregated space within the operator's line of sight, de facto preventing the use of all those applications based on autonomous operation for which they have been conceived, such as waypoint navigation.

A second advantage of the method and the device according to the invention is the possibility, for UAV operators, to authenticate and verify the integrity of the flight plan received from an external body, while at the same time the management body can verify a posteriori the observance of the flight plan by the UAV operator.

A third advantage of the method and the device according to the invention is that the technology used for verifying, authenticating and decrypting the flight plan is not very costly, in that it is based on a public key infrastructure, which is widely used for digital document signature and has the same legal value as an autograph signature on traditional documents, thus providing non-repudiation protection in favour of UAV operators.

A further advantage of the method and the device according to the present invention is that, by safely recording the flight data into a device that can only be read by the management and control body, a tool is available which can be used as evidence in the event of an accident undergone by the UAV; in fact, by analyzing the historical data one can understand, for example, if the accident was caused by an accidental failure or by inobservance of the flight plan by the UAV operator.

Finally, the use of a device comprising data only accessible to the management and control body fills a regulatory void in regard to spaces intended for UAV automatic flight; a law could, in fact, provide for making mandatory the use of the device of the present invention in order to allow using a UAV also beyond the operator's line of sight, in areas managed by external bodies. In Italy, for example, said management and control body could be ENAC (Ente NAzionale Civile); this body could manage said service by calculating and supplying flight plans to UAV operators using the device of the present invention, making its own public key available to them.

The method for allowing missions of unmanned aerial vehicles, in particular in non-segregated air space, described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a method for allowing missions of unmanned aerial vehicles, in particular in non-segregated air space, but may be subject to many modifications, improvements or replacements of equivalent parts and elements without departing from the novelty spirit of the inventive idea, as clearly specified in the following claims.

The invention claimed is:

1. A device adapted to be installed on board an unmanned aerial vehicle (UAV), comprising:
   an interface adapted to receive a document comprising data of a flight plan encrypted with a first private key associated with an air traffic management and control body and encoded with a second public key associated with the UAV;
   a control unit that includes a processor,
   wherein said control unit comprises means for authenticating the flight plan by decoding said encoded flight plan by applying a second private key associated with the UAV and then decrypting said encrypted flight plan by applying a first public key associated with said air traffic management and control body, so as to obtain a decrypted flight plan which can be used by said UAV.

2. The device according to claim 1, wherein said device further comprises a module for detecting UAV position data and a non-volatile memory, and wherein said control unit stores mission data in real time.

3. The device according to claim 2, wherein said data detection module comprises at least one GNSS module for obtaining the UAV position data through satellite signals.

4. The device according to claim 3, wherein said data detection module comprises a module of inertial motion sensors which, by co-operating with said GNSS module for obtaining the UAV position data through satellite signals, allows locating with more accuracy a path followed by the UAV during the mission.

5. The device according to claim 1, wherein the data stored in said memory are only accessible to the air traffic management and control body.

6. The device according to claim 5, wherein said data stored in said memory are accessible for a time period defined by said air traffic management and control body.

7. The device according to claim 5, wherein the data stored in said memory are only accessible to the air traffic management and control body through a set of access permissions.

8. The device according to claim 1, wherein said control unit comprises a microprocessor.

9. The device according to claim 1, wherein the data of the flight plan at least partially defines a mission to be undertaken by the UAV, the data of the flight plan comprising:
geographic coordinates of where the UAV will travel during the mission;
times of the mission; and
a vehicle profile of the UAV.

10. The device according to claim 9, wherein
said geographic coordinates comprise GPS coordinates;
said times of said mission comprise times of stopping over a point in order to take a photograph or to collect data from a sensor; and
said vehicle profile of the UAV comprise data relating to type, dimensions, weight, cruise speed, maximum turning angle.

11. The device of claim 1, wherein:
the flight plan is encrypted with the private key associated with the air traffic management and control body before being encoded with the public key associated with the vehicle; and
the means for authenticating decodes the flight plan with the private key associated with the vehicle before being decrypted with the public key associated with the air traffic management and control body.

12. The device of claim 1, wherein:
the flight plan is encrypted with the public key associated with the vehicle before being encoded with the private key associated with the air traffic management and control body; and
the means for authenticating decodes the flight plan with the public key associated with the air traffic management and control body before being decrypted with the private key associated with the vehicle.

13. The device of claim 1, wherein encrypting comprises signing or encoding and wherein encoding includes signing or encrypting and wherein decrypting includes decoding or decoding includes decrypting.

14. A device for allowing missions of unmanned aerial vehicles (UAV), the device adapted to be installed at an air traffic management and control body, the device comprising:
a receiver for receiving a flight plan prepared and sent by an operator of an UAV;
an encryptor that includes a processor for encrypting the flight plan of the UAV using a private key of the air traffic management and control body and a public key associated with the UAV so as to obtain an encrypted flight plan; and
a transmitter for sending said encrypted flight plan to the UAV for which said flight plan is intended.

15. The device according to claim 14, further comprising a verification unit for verifying that the mission carried out by said UAV complies with the flight plan authorized by said air traffic management and control body.

16. A device according to claim 15, wherein said verification unit verifies at least:
geographic coordinates of points flown over by the UAV during said mission;
times of said mission; and
a vehicle profile of the UAV.

* * * * *